United States Patent [19]
Belart

[11] 3,817,037
[45] June 18, 1974

[54] MASTER CYLINDER FOR TWO-CIRCUIT BRAKE SYSTEMS

[75] Inventor: Juan Belart, Walldorf, Germany

[73] Assignee: ITT Industries, Inc., New York, N.Y.

[22] Filed: Nov. 21, 1972

[21] Appl. No.: 308,379

[30] Foreign Application Priority Data
Dec. 24, 1971 Germany............................ 2164605
Dec. 24, 1971 Germany............................ 2164606

[52] U.S. Cl..................................... 60/552, 91/378
[51] Int. Cl............................................... F15b 9/10
[58] Field of Search ............ 60/547, 549, 552, 553, 60/560, 565, 566; 91/376, 378, 391

[56] References Cited
UNITED STATES PATENTS
| | | | |
|---|---|---|---|
| 2,410,269 | 10/1946 | Chouings............................ | 60/553 |
| 2,916,882 | 12/1959 | Spalding et al. ...................... | 91/378 |
| 3,638,528 | 2/1972 | Lewis........................................ | 91/6 |

FOREIGN PATENTS OR APPLICATIONS
1,917,954 10/1970 Germany.............................. 91/378

Primary Examiner—Edgar W. Geoghegan
Assistant Examiner—Zupcic A. M.
Attorney, Agent, or Firm—John T. O'Halloran; Monotti J. Lombardi, Jr.; Alfred C. Hill

[57] ABSTRACT

This relates to a master cylinder for a two-circuit brake system having a brake pressure medium pressure reservoir. The necessary pedal force applied by the driver is reduced to a minimum by this master cylinder. The master cylinder includes a control piston having a control surface to open a valve to apply pressure from the pressure reservoir to a first brake circuit. The control piston is slidably received in an auxiliary piston which also has the pressure applied to the brake pedal end thereof from the pressure reservoir when the valve opens. The auxiliary piston acts on a master piston which is disposed in tandem relation with the auxiliary piston to apply brake piston pressure to a second brake circuit. Due to the presence of the auxiliary piston excessive brake pedal travel due to failure of the second brake circuit is prevented. This is accomplished by the fact that the auxiliary piston when actuated by the pressure of the pressure reservoir moves the master piston until an abutment carried on an end of the master piston abuts the closed end of the master cylinder. This movement of the auxiliary piston is accomplished without movement of the control piston which is connected to the brake pedal. Thus, there is no pedal travel upon failure of the second brake circuit.

10 Claims, 1 Drawing Figure

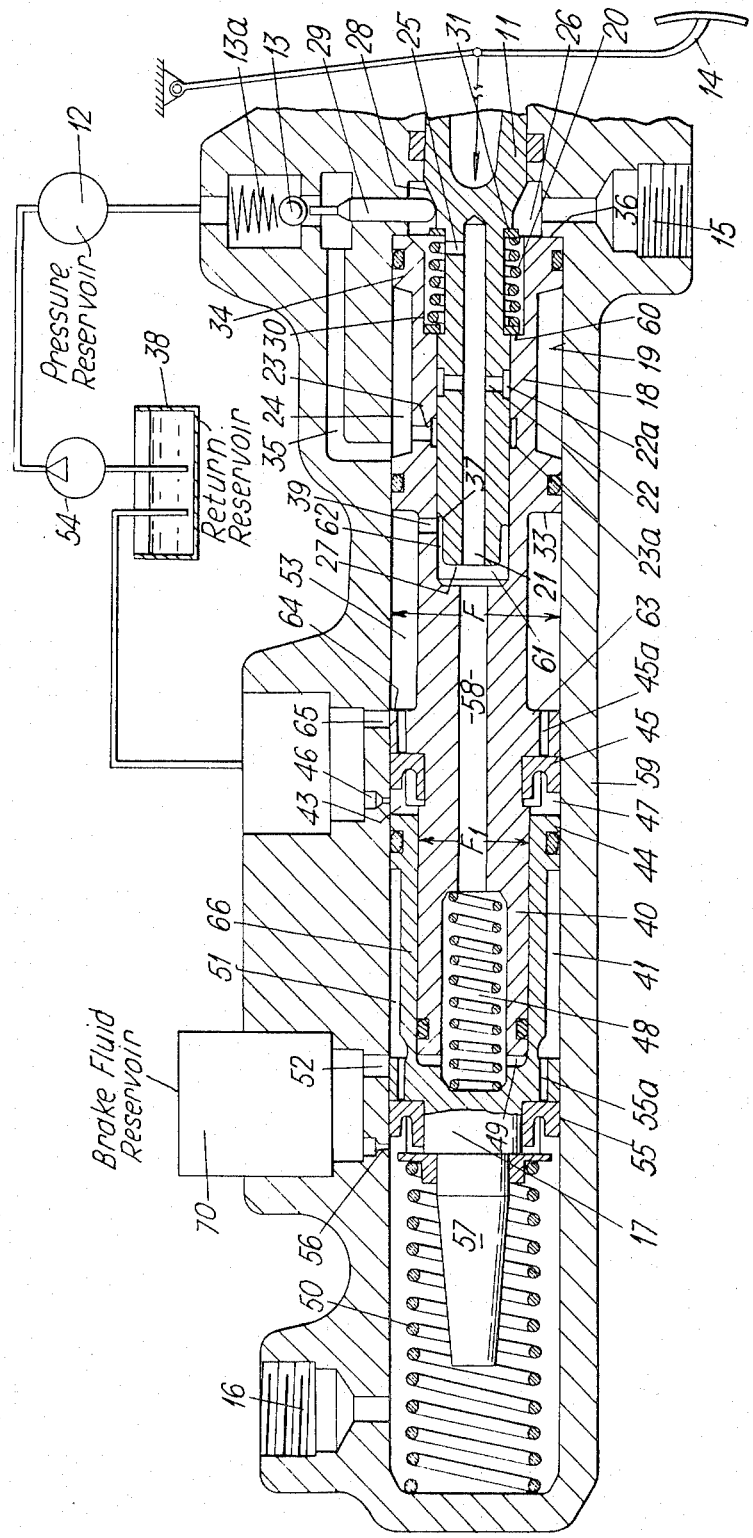

MASTER CYLINDER FOR TWO-CIRCUIT BRAKE SYSTEMS

BACKGROUND OF THE INVENTION

The invention relates to a master cylinder for two-circuit brake systems, especially for cars, having a pedal-actuated control piston which through forward movement opens a valve leading to a pressure reservoir and thus connects the first brake circuit with the pressure reservoir and whereupon a master piston applying pressure to the second brake circuit is actuated.

SUMMARY OF THE INVENTION

It is an object of the present invention to provide a master cylinder of the above type wherein the necessary pedal force which the driver must apply is reduced to a minimum, e.g., the actuating forces are largely supplied by the reservoir pressure. In case of failure of one brake circuit, however, the remaining brake circuit shall supply enough brake power that the car can safely be stopped. The master cylinder shall be economical concerning production and assembly and easy to maintain. Furthermore the cylinder shall be extremely reliable in all situations that may occur.

It is another object of the present invention to provide a master cylinder of the above described type in which the sudden undesired movement of the brake pedal through the full travel normally occurring in case of failure of the second brake circuit can be prevented in a simple and effective way.

A feature of the present invention is the provision of a master cylinder for two-circuit brake systems comprising: a first source of pressurized brake pressure medium; a housing having a longitudinal axis and a first longitudinal bore coaxial of the axis, the first longitudinal bore having a first given diameter; a auxiliary piston disposed in the first longitudinal bore coaxial of the axis, the auxiliary piston being axially displaceable in the first longitudinal bore and having a second longitudinal bore disposed adjacent one end thereof coaxial with the axis, the second longitudinal bore having a second given diameter less than the first given diameter, a control piston disposed in the second longitudinal bore coaxial of the axis; a brake pedal connected to the control piston adjacent the one end of the auxiliary piston; a master piston disposed in the first longitudinal bore coaxial of the axis and in tandem relation with the auxiliary piston; a first brake circuit connected through the wall of the housing adjacent the one end of the auxiliary piston; a second brake circuit connected through the wall of the housing adjacent the end of the master piston remote from the one end of the auxiliary piston; and a valve having a push rod extending radially through the wall of the housing to engage the outer surface of the control piston, the valve being connected to the first source so that upon actuation of the brake pedal the valve is opened by the advance of the control piston so that the pressure of the first source is applied to the first brake circuit to actuate the first brake circuit and is also applied to the one end of the auxiliary piston to actuate the auxiliary piston which in turn actuates the master piston to apply pressure to the second brake circuit.

In order to solve this problem the invention provides that a control piston is provided with a control surface which opens a valve. The control piston is axially displaceable within an auxiliary piston and the auxiliary piston in turn ia axially displaceable within a cylindrical bore of the master cylinder housing. During braking the auxiliary piston acts upon a master piston to increase the pressure in a second brake circuit. Between the control and the auxiliary pistons there is disposed a first spring which is so designed that after braking the control piston is returned to its initial position. However, the first return spring is not strong enough to overcome the forces that are opposed to the movement of the auxiliary piston and, thus, cannot displace the auxiliary piston during braking before the valve is opened and the auxiliary piston is supplied with pressure from the reservoir pressure. The first spring is considerably weaker than is necessary to displace the auxiliary piston and just suffices to return the control piston. According to the invention the control piston has to overcome a minimum of resistance, since the friction forces between the auxiliary piston and the housing wall need not be overcome. Thus, the pressure of the pressure reservoir 12 is set free with very little energy consumption and then the brake system is practically actuated only by the pressure of the pressure reservoir.

Another feature of the present invention is that the control piston is provided with a longitudinal bore and a transverse bore in communication with the longitudinal bore. The transverse bore interacts with a first radial bore in the auxiliary piston which at the outer surface of the auxiliary piston opens into a first chamber that leads to the valve. In addition a second transverse bore is disposed in the control piston in communication with the longitudinal bore which leads into a second chamber disposed adjacent the brake pedal end of the auxiliary piston. This second chamber is connected to the first brake circuit. With this construction, after alignment of the first transverse bores and the first radial bore in the auxiliary piston brake pedal end of the auxiliary piston as well as the first brake circuit are supplied with pressurized brake pressure medium.

Still another feature of the present invention is that the longitudinal bore ends adjacent the brake pedal end of the control piston within the auxiliary piston. Accordingly the connection to the pressure reservoir and the pressure application of the master piston for applying brake pressure to the second brake circuit is achieved through this longitudinal bore.

According to a further feature of the present invention a coaxial bore is provided at the brake pedal end of the housing bore to form the second chamber. This coaxial bore has a reduced diameter but which is, however, larger than the diameter of the control piston. For reasons of expediency the upward-sloping control surface of the control piston is situated within the range of this coaxial bore. Most favorably the coaxial bore diameter is at least as large as the control piston diameter at the point of maximum circumference of the control surface. Thus, practically a separate working space is created for the control surface and the valve push rod. In released position the auxiliary piston rests on the step between the coaxial bore and the housing bore of the master cylinder.

In accordance with the present invention a preferred design provides that the valve push rod extends radially into the second chamber embracing the control surface.

According to a further feature of this invention a ring-shaped cavity is provided between a portion of the outer surface of the control piston and a corresponding portion of the inner surface of the auxiliary piston to accommodate the first return spring. This design is extremely space-saving. According to the invention one end of the spring rests on a stop carried by the control piston and the other end rests on a stop carried by the auxiliary piston.

According to still a further feature of this invention the auxiliary piston is provided with a ring-shaped chamber between two guide pieces thereof in which the radial bore of the auxiliary piston terminates. The auxiliary piston is also provided with a channel starting at the valve and terminating in this chamber disregarding the position of the auxiliary piston. Thus in an uncomplicated manner the pressure of the pressure reservoir is supplied to the longitudinal and transverse bores of the control piston through the valve.

According to another feature of the present invention the brake pedal end of the auxiliary piston interacts with a ring-shaped step at the brake pedal end of the housing bore which functions as a stop. The design is such that the valve is closed when the auxiliary piston is completely withdrawn and the control piston is returned by means of the first return spring.

According to still another feature of the present invention the end of the control piston remote from the brake pedal is provided with a guiding edge, which interacts with a second radial bore of the auxiliary piston leading to a return reservoir in such a way that the longitudinal bore is connected with the return reservoir when the transverse bore of the control piston and the first radial bore of the auxiliary piston get out of alignment. Thus, a satisfactory pressure relief of the first brake circuit is provided.

According to the present invention a second longitudinal bore is provided in the auxiliary piston between the control piston and the master piston in communication with the first longitudinal bore. In addition an expansion port is disposed through the wall of the housing and in communication with the return reservoir. The expansion port is disposed between a ring-shaped end surface of the master piston and an annular sleeve mounted on the auxiliary piston at a given axial distance from the ring-shaped end surface of the master piston. This expansion port is so designed that during braking it is overridden by the annular sleeve and pressure is built up in the annular chamber which is formed by the annular sleeve, the inner wall of the housing bore, the ring-shaped surface, and the outer wall of the auxiliary piston. In case of failure of the second brake circuit the design according to this invention allows a movement of the master piston to the left, whereupon the annular chamber is filled with brake fluid from the return reservoir. Then when the auxiliary piston starts to move because of further pressure increase in the pressure reservoir circuit, the movement is stopped as soon as the annular sleeve overrides the expansion port.

According to the present invention a cavity is provided in the end of the auxiliary piston adjacent the master piston. A second spring is disposed in this cavity and is anchored to the master piston. This spring provides the master piston movement before the auxiliary piston starts to move.

According to still another feature of the present invention is that the second return spring is weaker than the third spring which returns the master piston to its rest position. The second spring is so designed that the master piston is pushed back by the third spring so that the second spring is compressed to enable the master piston to rest against the adjacent end of the auxiliary piston.

According to the present invention the auxiliary piston is returned to its rest position by the effect of the third spring acting on the front end of the master piston.

According to a further feature of the present invention an annular chamber is provided between a ring-shaped end of the master piston and the opposite end of the master piston. This annular chamber is connected to a follow-up bore in the housing leading to the brake pressure medium reservoir of the second brake circuit. In addition, for reasons of expediency the chamber on the brake pedal side of the annular sleeve mounted on the auxiliary piston is connected with the return reservoir.

According to the present invention the master piston is a normal hydraulic piston having an annular sleeve between the outer surface of the master piston and the inner surface of the housing interacting with an expansion port and a follow-up bore of a brake pressure fluid reservoir for the second brake circuit, except for the part thereof receiving and interacting with the adjacent end of the auxiliary piston. The master piston includes an axial projection extending toward the transverse wall closing the end of the housing functioning as stop.

In accordance with the present invention regardless of how important the function of the three return springs are to the operation of the master cylinder of this invention, the spring forces are insignificant in comparison to the forces produced by the working pressures created by the pressure reservoir. Ths springs are, thus, most important when the working pressures have not yet been built up.

According to the present invention the design of the spring constants and the surface of the master piston having a ring-shaped end is such that with regard to the friction values the master piston starts to move at a pressure inferior to that necessary for the displacement of the auxiliary piston. In short, it is important for the operation of the master cylinder of this invention that the annular chamber associated wtih the expansion port connected to the return reservoir is completely filled with brake fluid or brake pressure medium before the auxiliary piston starts to move and shuts off the expansion port.

BRIEF DESCRIPTION OF THE DRAWING

The above-mentioned and other features and objects of this invention and the manner of obtaining them will become more apparent by reference to the following description taken in conjunction with the drawing, the single FIGURE of which illustrates a longitudinal cross section of one embodiment of a master cylinder in accordance with the principles of the present invention and in which the brake pedal and brake pressure medium pressure generating elements cooperating with the master cylinder are schematically illustrated.

DESCRIPTION OF THE PREFERRED EMBODIMENT

In the FIGURE the master cylinder housing 59 having a longitudinal axis contains a control piston 11 disposed coaxial of the axis. From the end of housing 59 adjacent brake pedal 14 control piston 14 extends through the end of master cylinder housing 59 and extends into an appropriate cylindrical bore of an auxiliary piston 18 coaxial with the longitudinal axis.

In the position illustrated in the FIGURE, auxiliary piston 18 strikes against a ring-shaped step 36 of housing bore 19 on the right and extends to the left up to a chamber 41 of a master piston 17.

Immediately following its brake pedal actuated end control piston 11 is provided with a sloping control surface 28 within a bore 26 whose diameter is smaller than that of housing bore 19 but somewhat larger than that of the actuated end of control piston 11.

Push rod 29 of a globe valve 13 extends radially through the wall of housing 59 into bore 26. Valve 13 is prestressed in the closing direction by a spring 13a and on this side is connected with a pressure reservoir 12 which is charged by a pump 54.

The side of the valve 13 that is opposite from pressure reservoir 12 is connected by a channel 35 in housing 59 with an orifice in the inner wall of housing 59. This orifice leads into a ring-shaped chamber 24 in the outer surface of auxiliary piston 18. The ring-shaped chamber 24 extends between two guide pieces 33 and 34 of auxiliary piston 18 which are disposed in a slidably sealed relation with the inner surface of housing bore 19.

In the FIGURE control piston 11 is provided with a longitudinal bore 21 terminating in an orifice at the left end of control piston 11 and having a dead end at the right end thereof adjacent valve 13. Furthermore control piston 11 includes control transverse bores 22 and 25 in communication with longitudinal bore 21.

Control bores 22 are so arranged that they can be aligned with a radial bore 23 auxiliary piston 18, circular grooves 22a and 23a, respectively, improving the flow medium connection between bores 22 and 23.

According to this invention control piston 11 and auxiliary piston 18 are so designed that between control surface 28 and transverse bores 22 a ring-shaped cavity 30 is formed accommodating a weak return spring 20 which on the right rests against a stop 31 that is fixed on control piston 11 and on the left rests on the stop 32 which is fastened to auxiliary piston 18. According to the invention the stop 32 protrudes into ring-shaped recess of control piston 11 so that it limits at the same time the back stroke of control piston 11 by striking against the ring-shaped step 60.

The rear face or end 27 of control piston 11 opens into a chamber 61 which by means of a ring-shaped chamber 62 resulting from a reduction of the diameter of the ring-shaped area of control piston 11 communicates with a radial bore 39 through the wall of auxiliary piston 18 in position illustrated in the FIGURE. On the outside radial bore 39 opens into a ring-shaped chamber 53 which according to the invention is formed between guide piece 33 and the piston element 63. In the FIGURE illustrating auxiliary piston 18 in its released or rest position, ring-shaped chamber 53 is connected by means of an oblique bore 64 with a follow-up bore 65 that is connected with return reservoir 38 of pump 54.

The ring-shaped chamber 62 is provided with a guiding edge 37 at its right end which interacts with radial bore 39 in a way that will be described hereinbelow.

The first brake circuit 15 is connected radially to bore 26. According to this invention auxiliary piston 18 extends beyond piston element 63 to an end part 40. Auxiliary piston 18 includes longitudinal bore 58 extending from space 61 to the left which opens into an enlarged bore 48. Bore 48 serves as accommodating space for a spring 49 extending from the step between bores 48 and 58 and master piston 17 which supplies pressure to the second brake circuit 16.

In a conventional manner master piston 17 is provided with a ring-shaped sealing sleeve 55 and has an axial projection 57 pointing to the left. Sleeve 55 interacts with an expansion port 56 and a follow-up bore 52 connected to a brake pressure medium reservoir 70 for the second brake circuit 16.

According to this invention master piston 17 includes at the right end in the FIGURE a cylindrical projection 66 which forms between the outer surface thereof and the inner surface of bore 19 a chamber 41 that is sealed off and accommodates the sliding end part 40 of auxiliary piston 18. At the right end in the FIGURE projection 66 is widened and thereby forms a piston with a ring-shaped part 44 which is inserted into housing bore 19 in a slidably sealed relation. On the right side this piston with a ring-shaped part 44 is provided with a ring-shaped surface 43 which is vital for the operation of the master cylinder of the present invention.

On the right adjacent to ring-shaped surface 43 and annular sleeve 45, similar to annular sleeve 55, is provided which rests against piston element 63 and functions similar to a traditional master piston sealing sleeve. Sleeve 45 is connected by means of a bore 45a with ring-shaped chamber 53 leading to a reservoir as is a bore 55a on the right of sealing sleeve 55 leading to ring-shaped chamber 51 between cylindrical projection 66 and housing bore 19. Ring-shaped chamber 51 is connected to follow-up bore 52.

Master piston 17 is prestressed by a return spring 50 to the right in the FIGURE.

An expansion port 46 is provided between ring-shaped surface 43 and annular sleeve 45 which interacts in a conventional manner with annular sleeve 45.

Thus, ring-shaped surface 43, sealing sleeve 45 auxiliary piston 18, and housing bore 19 for a ring-shaped chamber 47 which is tightly sealed off after annular sleeve 45 has overriden expansion port 46.

The master cylinder according to this invention functions as follows:

When the brake pedal 14 is pressed control piston 11 is at first moved to the left to auxiliary piston 18 which is held in its rest position on the right against the stop at the ring-shaped step 36 by the force of return spring 50. According to this invention return spring 20 between auxiliary piston 18 and control piston 11 is so weak that it cannot overcome the friction forces keeping auxiliary piston 18 in its rest position nor force of spring 50 when brake pedal 14 is actuated. In short control piston 11 can be displaced with very little energy consumption.

Shortly before transverse bore 22 and radial bore 23 are aligned guiding edge 37 overrides the left edge of radial bore 39 so that the interior of control piston 11 and first brake circuit 15 are cut off from reservoir 38. In the course of this movement of control piston 11 push rod 29 of valve 13 moves upwards on control surface 28 and valve 13 is opened. Now the pressure of reservoir 12 passes through channel 35 and is kept in the ring-shaped chamber 24 and radial bore 23. As soon as circular grooves 22a and 23a overlap the reservoir pressure arrives at longitudinal bores 21 and 58. This causes at first a reaction force acting upon pedal 14 and first brake circuit 15 is supplied with pressure as desired via transverse bore 25 and face bore 26. The right ring-shaped surface at the end auxiliary piston 18 in bore 26 is also pressure-supplied so that auxiliary piston 18 is pushed to the left in the FIGURE. Master piston 17 is directly supplied with pressure through bores 48 and 58, whereupon piston 17 moves to the left and when expansion port 56 has been overridden by sleeve 55 a pressure is built up in brake circuit 16 having essentially the same value as the pressure in first brake circuit 15, since master piston 17 is not only pressure-supplied through bores 48 and 58 but is also pressure-supplied at ring-shaped surface 43 by sleeve 45 upon movement of auxiliary piston 18 after expansion port 46 has been overridden.

After braking master piston 17, auxiliary piston 18, and control piston 11 are returned to their intitial or rest position by means of the pressure in the brake circuits as well as by return springs 20 and 50.

The designing according to this invention prevents any sudden undesired movement of pedal 14 through the full travel thereof in case of failure of second brake circuit 16, preferably leading to the front axle, which would give an unpleasant feeling to the driver. This, however, is only possible if master piston 17 can be displaced by a reservoir pressure inferior to that which is necessary for the displacement of auxiliary piston 18.

In case of failure of the second brake circuit 16 the master cylinder functions as follows:

The functioning is the same as during braking with intact brake circuits until the pressure arrives as longitudinal bores 21 and 58. However, as soon as a predetermined pressure has been reached in the enlarged bore 48 master piston 17 is immediately moved to the left by means of this pressure and the supporting force of spring 49 as well as by means of the compression of spring 50 until pojection 57 strikes the housing bottom or the transverse closing wall. Because of the supposed defect in second brake circuit 16 no pressure can be built up on the left side of master piston 17.

Since the surface $F_1$ and springs 49 and 50 are so designed with regard to the friction of the different elements that auxiliary piston 18 has not yet moved, master piston 17 moving to the left ensures that ring-shaped chamber 47, which widens in the course of the movement of master piston 17, is filled with brake fluid through expansion port 46, i.e., master piston 17 will suck in brake fluid from reservoir 38 into ring-shaped chamber 47 through expansion port 46.

As soon as master piston 17 has achieved its final position on the left the pressure increases in bores 21 and 58 whereupon auxiliary piston 18 is finally moved to the left due to the pressure acting on the ring-shaped surface $F-F_1$. This movement is further supported by spring 20. During this movement annular sleeve 45 overrides expansion port 46 and ring-shaped chamber 47 is tightly shut off on all sides. From now on any further movement of the auxiliary piston to the left is prevented because of the incompressibility of the brake fluid. Thus, the unpleasant sudden movement of the brake pedal through the full travel is eliminated in the design of the master cylinder according to this invention. From this moment on the braking process in first brake circuit 15 is exactly the same as with intact brake circuits.

Projection 57 has a length such that during normal braking it does not reach the housing bottom, but in case of failure of the second brake circuit it has to cover only a rather short distance until it strikes the housing bottom.

According to this invention the axial space between the rear face or end surface 27 of control piston 11 and the ring-shaped step at the transition point of chamber 61 and bore 58 is so small that in case of failure of pressure reservoir 12 or first brake circuit 15 face surface 27 strikes against said ring-shaped step. Now master piston 17 can be immediately supplied by the pedal force via auxiliary piston 18 so that a certain braking effect can still be achieved by applying pressure to second brake circuit 16.

Normally the left face or end part 40 rests against master piston 17.

During any braking action the left face may occasionally move slightly back. Master piston 17 and the face of end part 40 are completely separated only in the case of failure of second brake circuit 16.

According to this invention the resilience of springs 49 and 50 shall not vary too much in the different positions. The spring 50, e.g., has a resilience of approximately 6 kgf (kilograms-force) when it is stretched and a resilience of about 4 kgf when it is slack, this means a resilience difference of 30 percent.

While I have described above the principles of my invention in connection with specific apparatus it is to be clearly understood that this description is made only by way of example and not as a limitation to the scope of my invention as set forth in the objects thereof and in the accompanying claims.

I claim:

1. A master cylinder for two-circuit brake systems comprising:

a first source of pressurized brake pressure medium;

a housing having a longitudinal axis and a first longitudinal bore coaxial of said axis, said first longitudinal bore having a first given diameter;

a auxiliary piston disposed in said first longitudinal bore coaxial of said axis, said auxiliary piston being axially displaceable in said first longitudinal bore and having a second longitudinal bore disposed adjacent one end thereof coaxial with said axis, said second longitudinal bore having a second given diameter less than said first given diameter;

a control piston disposed in said second longitudinal bore coaxial of said axis;

a brake pedal connected to said control piston adjacent said one end of said auxiliary piston;

a master piston disposed in said first longitudinal bore coaxial of said axis and in tandem relation with said auxiliary piston;

a first brake circuit connected through the wall of said housing adjacent said one end of said auxiliary piston;

a second brake circuit connected through the wall of said housing adjacent the end of said master piston remote from said one end of said auxiliary piston;

a valve having a push rod extending radially through the wall of said housing to engage the outer surface of said control piston, said valve being connected to said first source so that upon actuation of said brake pedal said valve is opened during all braking operations by the advance of said control piston so that the pressure of said first source is applied to said first brake circuit to actuate said first brake circuit and is also applied to said one of said auxiliary piston to actuate said auxiliary piston which in turn actuates said master piston to apply pressure to said second brake circuit;

a first spring disposed between said auxiliary piston and said control piston, said first spring being considerably weaker than is necessary to displace said auxiliary piston against the forces opposing the movement of said auxiliary piston during a braking operation but yet strong enough to return said control piston to its rest condition after a braking operation;

said control piston including
 a third longitudinal bore, and
 a first transverse bore in communication with said third longitudinal bore;

said auxiliary piston including
 a first radial bore extending through the wall of said auxiliary piston in communication with said valve at the outer surface of said auxiliary piston and capable of being aligned with said first transverse bore upon advance of said control piston;

a first chamber embracing said one end of said auxiliary piston;

said control piston including
 a second transverse bore in communication with said third longitudinal bore and said first chamber;

said first brake circuit being connected to said first chamber;

said third longitudinal bore being terminated within said control piston between said second transverse bore and the point of engagement of said push rod with the outer surface of said control piston;

said first chamber being formed by a first portion of said housing adjacent said one end of said auxiliary piston having a third given diameter less than said first given diameter but larger than said second given diameter;

said control piston including
 a control surface disposed in said first chamber to engage said push rod, said control surface including a portion descending toward said one end of said auxiliary piston;

said third diameter of said first portion of said housing being at least the same diameter of said control piston at the maximum circumference of said control surface;

a ring-shaped cavity formed by a portion of the inner surface of said auxiliary piston and a corresponding portion of the outer surface of said control piston to receive said first spring;

said auxiliary piston including
 two spaced guide pieces engaging and slidably sealed to the inner surface of said first longitudinal bore, and
 a second chamber disposed between said guide pieces, the inner surface of said first longitudinal bore and the outer surface of said auxiliary piston, said second chamber being in communication with said first radial bore;

a channel disposed in said housing in communication with said valve and said second chamber;

a step at the transition between said first longitudinal bore and said first portion of said housing interacting with said one end of said auxiliary piston to provide a stop for said auxiliary piston;

said first source including
 a pressure reservoir connected to said valve,
 a pump connected to said pressure reservoir to charge said pressure reservoir, and
 a return reservoir connected to said pump;

a guiding edge disposed adjacent the end of said control piston remote from said first chamber; and a second radial bore extending through the wall of said auxiliary piston into said second longitudinal bore in an interacting relation with said guiding edge such that said second radial bore is in communication with said return reservoir and said third longitudinal bore when said first transverse bore and said first radial bore are misaligned;

said master piston including
 a longitudinal hollow cylindrical member extending from said master piston toward said one end of said auxiliary piston coaxial of said axis, and a ring piston formed on the end of said cylindrical member adjacent said one end of said auxiliary piston slidably sealed to the inner surface of said first longitudinal bore, said ring piston providing a ring shaped surface adjacent said one end of said auxiliary piston;

said auxiliary piston including
 a cylindrical extension thereof slidably sealed to the inner surface of said cylindrical member and disposed coaxial of said axis;

a fourth longitudinal bore extending from said second longitudinal bore to said master piston, said fourth longitudinal bore being in communication with said third longitudinal bore, and a first annular sleeve mounted between the outer surface of said extension and the inner surface of said first longitudinal bore, said first sleeve being axially spaced from said ring shaped surface; and an expansion port extending through the wall of said housing between said first sleeve and said ring-shaped surface, said expansion port being connected to said return reservoir, said expansion port being overridden by said first sleeve during braking so that pressure is built up in a third chamber formed by said first sleeve, the inner surface of said first longitudinal bore, said ring-shaped surface and the outer surface of said extenson.

2. A master cylinder according to claim 1, wherein said fourth longitudinal bore includes
an enlarged diameter portion adjacent said master piston; and further including
a second spring disposed in said enlarged diameter portion and connected to said master piston.

3. A master cylinder according to claim 2, further including
a wall disposed transverse of said axis remote from said one end of said auxiliary piston closing off said first longitudinal bore; and
a third spring disposed between said wall and said master piston to return said master piston to its rest position after a braking operation;

said second spring being weaker than said third spring so that said master piston is pushed back until it rests against the adjacent end of said extension after said second spring has been compressed.

4. A master cylinder according to claim 3, further including
a second source of brake pressure medium for said second brake circuit;
a fourth chamber formed between said ring piston, said master piston, the outer surface of said cylindrical member and the inner surface of said first longitudinal bore; and
a follow-up bore extending through the wall of said housing in communication with said second source and said fourth chamber.

5. A master cylinder according to claim 4, further including
a fifth chamber formed by said first sleeve, the adjacent one of said guide pieces, the outer surface of said extension and the inner surface of said first longitudinal bore in communication with said return reservoir.

6. A master cylinder according to claim 5, further including
an expansion port in communication with said second source; and wherein
said master piston includes
a second annular sleeve disposed between the outer surface of said master cylinder and the inner surface of said first longitudinal bore, said second sleeve interacting with said expansion port and said follow-up bore.

7. A master cylinder according to claim 6, further including
an axial projection extending from said master piston toward said transverse wall to function as a stop.

8. A master cylinder according to claim 7, wherein
the forces of said first, second and third springs are small compared with the forces produced by said pressurized brake pressure medium supplied from said first source.

9. A master cylinder according to claim 8, wherein
the resilience of said second and third springs and the area of said ring shaped surface are selected with respect to friction forces so that said master piston starts to move axially at a given pressure less than the pressure necessary to displace said auxiliary piston axially. bra 10. A master cylinder for two-circuit brake systems comprising:
a first source of pressurized brake pressure medium;

a housing having a longitudinal axis and a first longitudinal bore coaxial of said axis, said first longitudinal bore having a first given diameter;
an auxiliary piston disposed in said first longitudinal bore coaxial of said axis, said auxiliary piston being axially displaceable in said first longitudinal bore and having a second longitudinal bore disposed adjacent one end thereof coaxial with said axis, said second longitudinal bore having a second given diameter less than said first given diameter;
a control piston disposed in said second longitudinal bore coaxial of said axis;
a brake pedal connected to said control piston adjacent said one end of said auxiliary piston;
a master piston disposed in said first longitudinal bore coaxial of said axis and in tandem relation with said auxiliary piston;
a first brake circuit connected through the wall of said housing adjacent said one end of said auxiliary piston;
a second brake circuit connected through the wall of said housing adjacent the end of said master piston remote from said one end of said auxiliary piston;

a valve having a push rod extending radially through the wall of said housing to engage the outer surface of said control piston, said valve being connected to said first source so that upon actuation of said brake pedal said valve is opened during all braking operations by the advance of said control piston so that the pressure of said first source is applied to said first brake circuit to actuate said first brake circuit and is also applied to said one end of said auxiliary piston to actuate said auxiliary piston which in turn actuates said master piston to apply pressure to said second brake circuit;
said master piston including
a longitudinal hollow cylindrical member extending from said master piston toward said one end of said auxiliary piston coaxial of said axis, and a ring piston formed on the end of said cylindrical member adjacent said one end of said auxiliary piston slidably sealed to the inner surface of said first longitudinal bore, said ring piston providing a ring shaped surface adjacent said one end of said auxiliary piston; and
said auxiliary piston including
a cylindrical extension thereof slidably sealed to the inner surface of said cylindrical member and disposed coaxial of said axis,
a third longitudinal bore extending from said second longitudinal bore to said master piston, said third longitudinal bore being in communication with a fourth longitudinal bore in said control piston, and
a first annular sleeve mounted between the outer surface of said extension and the inner surface of said first longitudinal bore, said first sleeve being axially spaced from said ring shaped surface; and an expansion port extending through the wall of said housing between said first sleeve and said ring shaped surface, said expansion port being connected to said return reservoir, said expansion port being overridden by said first sleeve during braking so that pressure is built up in a third chamber formed by said first sleeve, the inner surface of said first longitudinal bore, said ring-shaped surface and the outer surface of said extension.

* * * * *